(12) United States Patent
Itoko et al.

(10) Patent No.: US 11,410,069 B2
(45) Date of Patent: Aug. 9, 2022

(54) GROUPING OF PAULI OBSERVABLES USING BELL MEASUREMENTS

(71) Applicant: International Business Machines Corporation, Armonk, NY (US)

(72) Inventors: Toshinari Itoko, Chigasaki (JP); Takashi Imamichi, Kanagawa (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 713 days.

(21) Appl. No.: 16/394,003

(22) Filed: Apr. 25, 2019

(65) Prior Publication Data
US 2020/0342343 A1   Oct. 29, 2020

(51) Int. Cl.
  *G06N 10/00*   (2022.01)
  *B82Y 10/00*   (2011.01)
  *G06F 9/38*    (2018.01)
  *G06F 17/16*   (2006.01)

(52) U.S. Cl.
  CPC .............. *G06N 10/00* (2019.01); *B82Y 10/00* (2013.01); *G06F 9/3877* (2013.01); *G06F 17/16* (2013.01); *G06F 2009/3883* (2013.01)

(58) Field of Classification Search
  CPC . G06N 10/00; B82Y 10/00; G06F 2009/3883; G06F 9/3877; G06F 17/16
  USPC .......................................................... 708/3
  See application file for complete search history.

(56) References Cited

U.S. PATENT DOCUMENTS

| 8,386,899 | B2 | 2/2013 | Goto et al. |
| 8,504,497 | B2 | 8/2013 | Amin |
| 2010/0251049 | A1 | 9/2010 | Goto et al. |
| 2010/0306142 | A1 | 12/2010 | Amin |
| 2020/0287631 | A1* | 9/2020 | Gimeno-Segovia ... G06N 10/00 |
| 2021/0182726 | A1* | 6/2021 | Harry Putra ........... G06N 10/00 |
| 2021/0216900 | A1* | 7/2021 | Higgott ............... G06F 11/3409 |

OTHER PUBLICATIONS

Zwerger et al, Hybrid architecture for encoded measurement-based quantum computation, arXiv:1308.4561v1 [quant-ph] Aug. 21, 2013. (Year: 2013).*
G. M. D'Ariano, P. Lo Presti, and M. F. Sacchi, "Bell measurements and observables," Physics Letters A 272, No. 1-2 (2000).

(Continued)

*Primary Examiner* — Tan V Mai
(74) *Attorney, Agent, or Firm* — Garg Law Firm, PLLC; Rakesh Garg; Joseph Petrokaitis

(57) ABSTRACT

The illustrative embodiments provide a method, system, and computer program product. In an embodiment, a method includes receiving a set of Pauli observables. In an embodiment, a method includes initializing a measurement basis, the measurement basis comprising a set of Pauli bases equivalent to a number of qubits of a quantum processor. In an embodiment, a method includes creating a list of a set of Bell basis candidates, each of the set of Bell basis candidates configured to measure at least one of the set of Pauli observables. In an embodiment, a method includes selecting a Bell basis candidate from the set of Bell basis candidates. In an embodiment, a method includes reconfiguring the measurement basis to replace a subset of the set of Pauli bases with the selected Bell basis candidate.

20 Claims, 10 Drawing Sheets

(56) References Cited

OTHER PUBLICATIONS

Pawel Wocjan, Martin Rötteler, Dominik Janzing, and Thomas Beth, "Simulating Hamiltonians in quantum networks: Efficient schemes and complexity bounds," Physical Review A 65, No. 4 (2002).
Nikolaj Moll, Andreas Fuhrer, Peter Staar, and Ivano Tavernelli, "Optimizing qubit resources for quantum chemistry simulations in second quantization on a quantum computer," Journal of Physics A: Mathematical and Theoretical 49, No. 29 (2016).
Gregg Jaeger, "Bell gems: the Bell basis generalized," Physics Letters A 329, No. 6 (2004).
Ian D. Kivlichan, Jarrod McClean, Nathan Wiebe, Craig Gidney, Alán Aspuru-Guzik, Garnet Kin-Lic Chan, and Ryan Babbush, "Quantum simulation of electronic structure with linear depth and connectivity," Physical review letters 120, No. 11 (2018).
Serey Bravyi, et al., Tapering off qubits to simulate fermionic Hamiltonians, Jan. 27, 2017.

* cited by examiner

GROUPING OF PAULI OBSERVABLES USING BELL MEASUREMENTS

TECHNICAL FIELD

The present invention relates generally to a method, system, and computer program product for configuring optimization problems to run in quantum computing data processing environments. More particularly, the present invention relates to a method, system, and computer program product for grouping of Pauli observables using Bell measurements.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

A superconducting qubit includes a Josephson junction. A Josephson junction is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In a qubit, the Josephson junction—which functions as a dispersive nonlinear inductor—is electrically coupled in parallel with one or more capacitive devices forming a nonlinear microwave oscillator. The oscillator has a resonance/transition frequency determined by the value of the inductance and the capacitance in the qubit. Any reference to the term "qubit" is a reference to a superconducting qubit oscillator circuitry that employs a Josephson junction, unless expressly distinguished where used.

The information processed by qubits is carried or transmitted in the form of microwave signals/photons in the range of microwave frequencies. The microwave frequency of a qubit output is determined by the resonance frequency of the qubit. The microwave signals are captured, processed, and analyzed to decipher the quantum information encoded therein. A readout circuit is a circuit coupled with the qubit to capture, read, and measure the quantum state of the qubit. An output of the readout circuit is information usable by a q-processor to perform computations.

A superconducting qubit has two quantum states—|0> and |1>. These two states may be two energy states of atoms, for example, the ground (|g>) and first excited state (|e>) of a superconducting artificial atom (superconducting qubit). Other examples include spin-up and spin-down of the nuclear or electronic spins, two positions of a crystalline defect, and two states of a quantum dot. Since the system is of a quantum nature, any combination of the two states are allowed and valid.

For quantum computing using qubits to be reliable, quantum circuits, e.g., the qubits themselves, the readout circuitry associated with the qubits, and other parts of the quantum processor, must not alter the energy states of the qubit, such as by injecting or dissipating energy, in any significant manner or influence the relative phase between the |0> and |1> states of the qubit. This operational constraint on any circuit that operates with quantum information necessitates special considerations in fabricating semiconductor and superconducting structures that are used in such circuits.

A Pauli observable is a tensor product of Pauli operators, represented as a n-character string of identity operator "I" and Pauli operators "X", "Y", or "Z", where n is the number of qubits in the quantum processor. A Pauli base corresponds to one of the Pauli operators in a one-qubit quantum processor. Each Pauli operator is measured by its corresponding Pauli base and each Pauli base also measures the identity operator. For example, operators "I" and "X" are measurable in Pauli base "X".

A Pauli Tensor Product Basis (TPB) is given by a tensor product of Pauli basis in an n-qubit quantum processor, represented as an n-character string of Pauli bases "X", "Y", or "Z". A Pauli observable, P, is measurable in Pauli TPB, B, if and only if, for each qubit, q, of the n-qubit quantum processor, the measurement base, b, of the qubit, q, is able to measure the Pauli observable of the qubit, q.

Bell basis is a basis corresponding with an operator that creates a Bell state in a two-qubit system, represented as B(i, j) where (i, j) is the pair of qubits the operator acts on. For example, Pauli observables "II", "XX", "YY", and "ZZ" are measurable in Bell base B(0, 1).

The illustrative embodiments recognize that reducing the number of measurements by selecting appropriate measurement basis reduces the computation time and computation cost for a quantum processor. The illustrative embodiments further recognize that grouping Pauli observables that are simultaneously measurable reduces the number of measurements performed by a quantum processor. The illustrative embodiments recognize that a hybrid basis using Bell basis and Pauli TPB can reduce the number of measurements necessary to perform on the quantum processor.

SUMMARY

The illustrative embodiments provide a method, system, and computer program product. In an embodiment, a method includes receiving a set of Pauli observables. In an embodiment, a method includes initializing a measurement basis, the measurement basis comprising a set of Pauli bases equivalent to a number of qubits of a quantum processor.

In an embodiment, a method includes creating a list of a set of Bell basis candidates, each of the set of Bell basis candidates configured to measure at least one of the set of Pauli observables. In an embodiment, a method includes selecting a Bell basis candidate from the set of Bell basis candidates. In an embodiment, a method includes reconfiguring the measurement basis to replace a subset of the set of Pauli bases with the selected Bell basis candidate.

In an embodiment, the set of Pauli bases are the same Pauli basis. In an embodiment, a method includes computing a set of scores for the set of Bell basis candidates. In an embodiment, a method includes comparing the set of scores to determine a maximum score. In an embodiment, the selected Bell basis candidate corresponds to the maximum score.

In an embodiment, a method includes removing the selected Bell basis candidate from the list. In an embodiment, a method includes determining whether a qubit in the selected Bell basis candidate matches a qubit of at least one Bell basis candidate in the list. In an embodiment, a method includes removing the at least one Bell basis candidate from the list.

In an embodiment, a method includes determining whether the list is empty. In an embodiment, a method includes returning, responsive to the list being empty, a subset of the set of Pauli observables measurable by the reconfigured measurement basis. In an embodiment, a method includes computing, responsive to the list comprising at least one Bell basis candidate, a second set of scores for the set of Bell basis candidates. In an embodiment, a method includes selecting a second Bell basis candidate from the set of Bell basis candidates. In an embodiment, a method includes reconfiguring the measurement basis to replace a second subset of the set of Pauli bases with the selected second Bell basis candidate.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

In an embodiment, the program instructions are stored in a computer readable storage device in a data processing system, and wherein the program instructions are transferred over a network from a remote data processing system.

In an embodiment, the program instructions are stored in a computer readable storage device in a server data processing system, and wherein the program instruction are downloaded over a network to a remote data processing system for use in a computer readable storage device associated with the remote data processing system

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
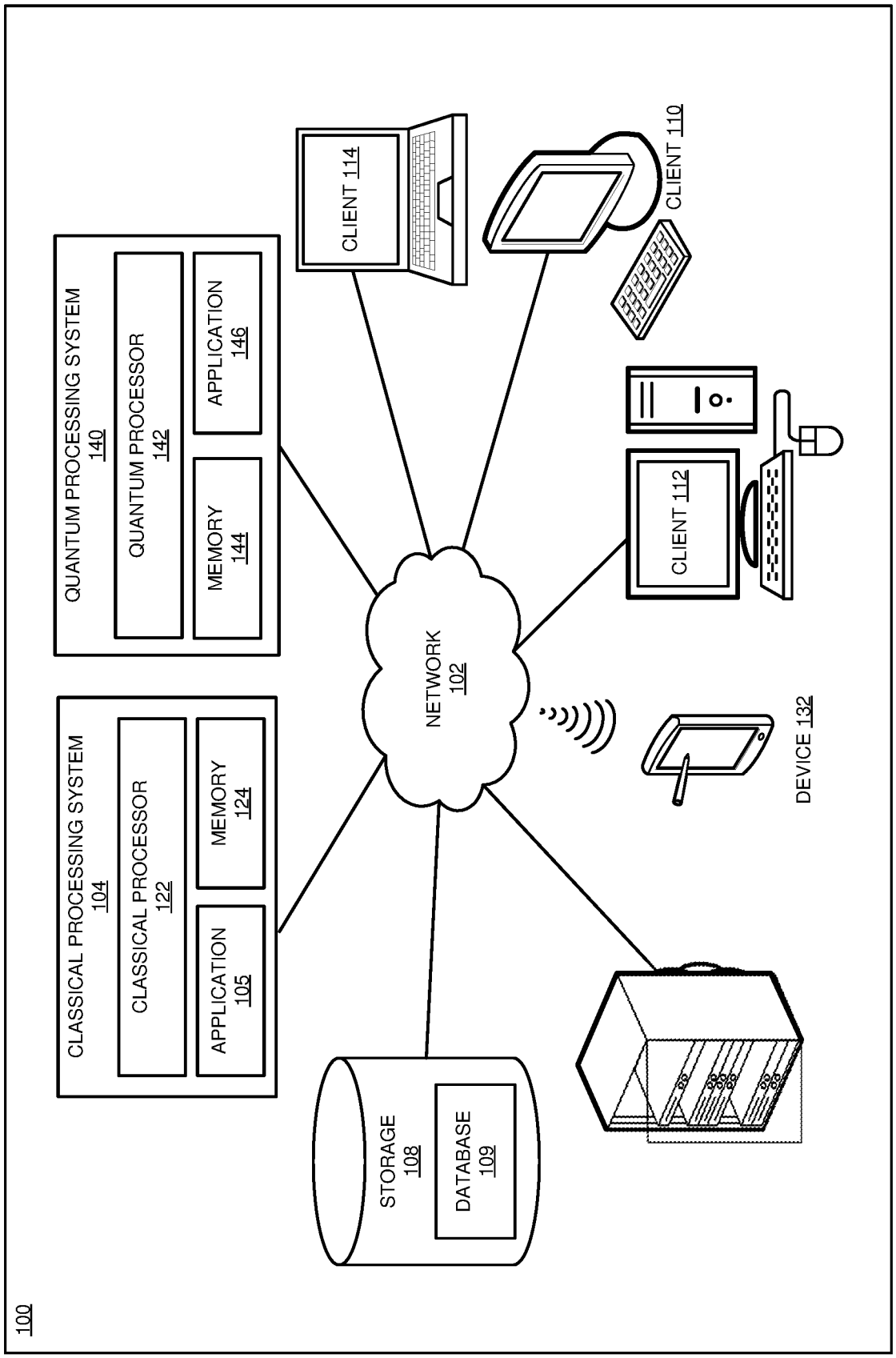
FIG. 1 depicts a block diagram of a network of data processing systems in which illustrative embodiments may be implemented.

Computing of optimization problems is a well-recognized technological field of endeavor. Quantum computing using processors formed from quantum qubits is another well recognized technological field of endeavor. The present state of the technology in a combination of these two fields of endeavor has certain drawbacks and limitations. The operations and/or configurations of the illustrative embodiments impart additional or new capabilities to improve the existing technology in these technological fields of endeavor, especially in configuring optimization problems for execution in quantum computing environments.

The advent of quantum computing has presented advancement possibilities in many areas of computing, including the computation of optimization problems. Because a quantum computing system can evaluate many solutions from the solution space at once, the illustrative embodiments recognize that such systems can be suitable for solving optimization problems.

The illustrative embodiments recognize that solving an optimization problem in quantum computing typically requires translating the optimization problem, along with its inputs, into a qubit Hamiltonian, and then passing the qubit Hamiltonian to a quantum variational algorithm, such as the Variational Quantum Eigensolver (VQE) algorithm and the Quantum Approximate Optimization Algorithm (QAOA).

The objective of the VQE is to calculate an eigenvalue and/or eigenvector of a qubit Hamiltonian in a Schrodinger equation. Therefore, the VQE identifies the θ that minimizes the expectation value $<\Psi(\theta)|H_q|\Psi(\theta)>$ of a qubit Hamiltonian. In the following description, the term "quantum computer" also includes a classical quantum hybrid type of computer made by incorporating a quantum circuit in a classical computer.

For example, the VQE first calculates an expectation value $<\Psi(\theta)|H_q|\Psi(\theta)>$ for $\theta_1$, which is an initial e. The qubit Hamiltonian $H_q$ is expressed as a linear combination of an identity operator I and a tensor product of Pauli operators (σx, σy, and σz). Such a tensor product is also referred to as a Pauli observable.

Here, an example of a qubit Hamiltonian $H_q$ including a Pauli observable IZXZ, a Pauli observable ZXZI, a Pauli observable XXXX, a Pauli observable ZIZX, and a Pauli observable IZXZ is used. In this example, the qubit Hamiltonian $H_q$ is expressed as shown below.

$$H_q = aIZXZ + bZXZI + cXXXX + dZIZX + eIZXZ \quad \text{Expression 1:}$$

Here, X, Y, and Z respectively represent the Pauli operators $\sigma_x$, $\sigma_y$, and $\sigma_z$, and "a" to "e" represent coefficients.

The VQE divides the expectation value $<\Psi(\theta)|H_q|\Psi(\theta_1)>$ into Pauli observables to perform the calculation. For example, in order to calculate the expectation value obtained from θ1, each of $<\Psi(\theta_1)|IZXZ|\Psi(\theta_1)>$, $<\Psi(\theta_1)|ZXZI|\Psi(\theta_1)>$, $<\Psi(\theta_1)|XXXX|\Psi(\theta_1)>$, $<\Psi(\theta_1)|ZIZX|\Psi(\theta_1)>$, and $<\Psi(\theta_1)|XZIZ|\Psi(\theta_1)>$ is calculated, as shown in FIG. 3.

The calculation of $<\Psi(\theta_1)|IZXZ|\Psi(\theta_1)>$ is performed many times (e.g. 100 times) for θ1. The calculation of $<\Psi(\theta_1)|IZXZ|\Psi(\theta_1)>$ is performed by a quantum computer using quantum calculation, but the results of each trial are obtained stochastically. Therefore, by performing the calculation many times for the Pauli observable IZXZ, the result of $<\Psi(\theta_1)|IZXZ|\Psi(\theta_1)>$ is obtained statistically.

Figure 3:
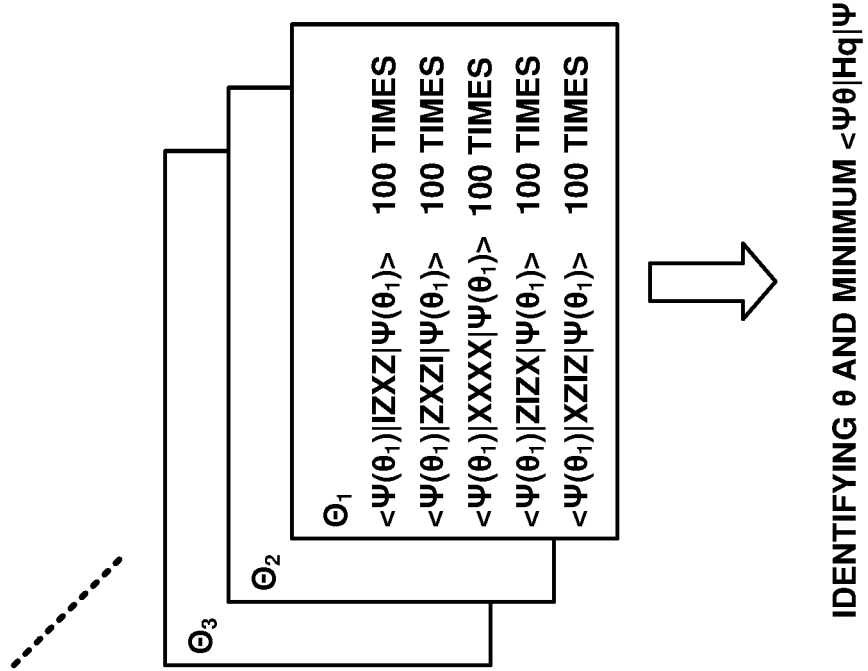
FIG. 3 depicts a block diagram of an example expectation value calculation in accordance with an illustrative embodiment.

In the example of FIG. 3, the quantum computer calculates five types of Pauli observables for θ1 100 times each (i.e. a total of 500 calculations). Next, in a similar manner, the quantum calculation is performed many times for θ2, which is obtained by updating θ, and an expectation value is calculated. Furthermore, θ is sequentially updated and corresponding expectation values are calculated. In this way, with the VQE, the minimum value of the expectation value $<\Psi(\theta)|H_q|\Psi(\theta)>$ is searched while updating θ.

In other words, the VQE can be treated as performing a loop with a three-iteration structure. In the three-iteration structure, the first loop of the outermost iteration performs the update of θ, the second loop of the middle iteration statistically calculates the expectation value for each Pauli observable, and the third loop of the inner iteration performs quantum calculation of the Pauli observables one time each.

Figure 4:
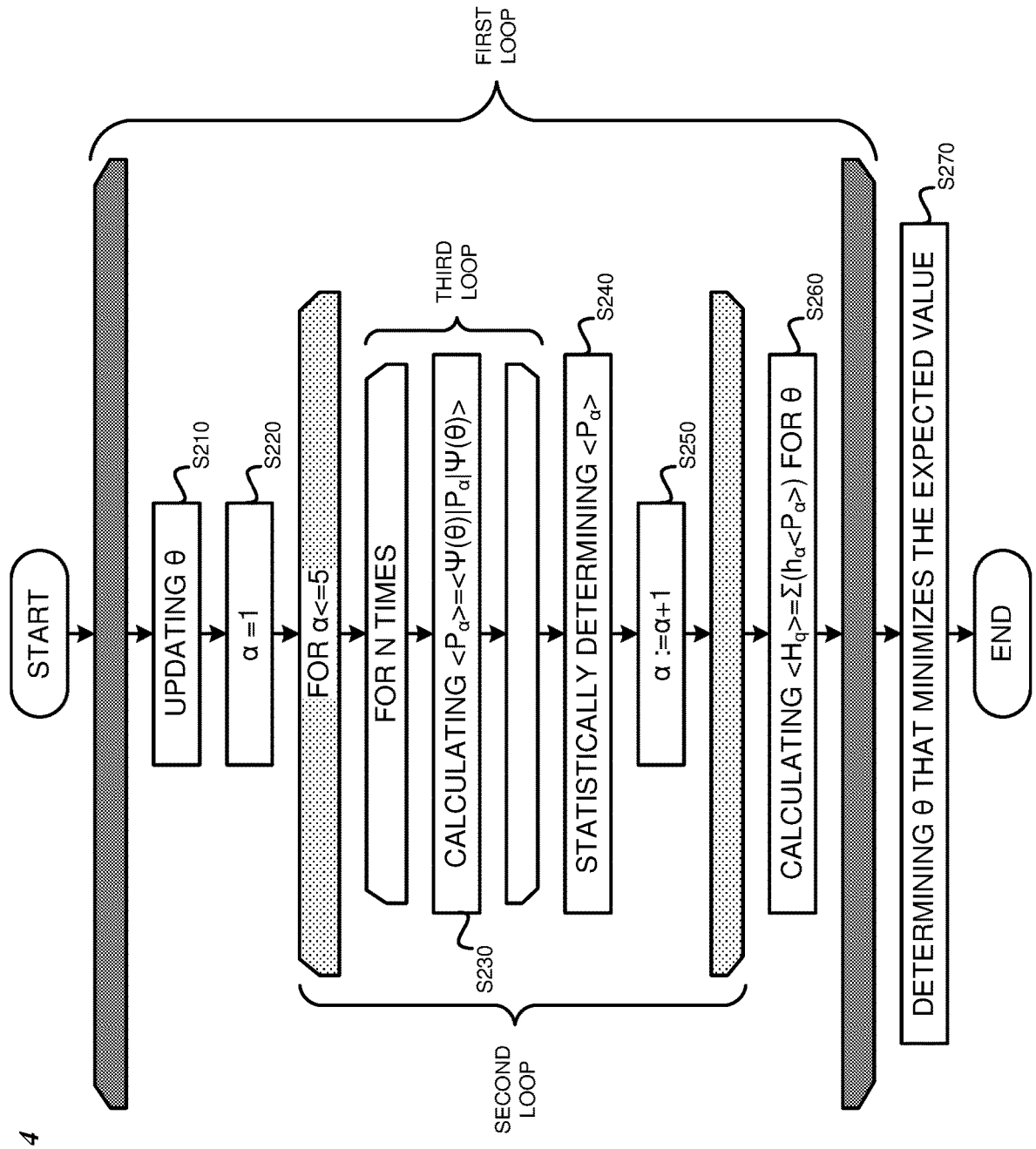
FIG. 4 depicts a flowchart of an example process for calculating expectation values in accordance with an illustrative embodiment.
Figure 5:
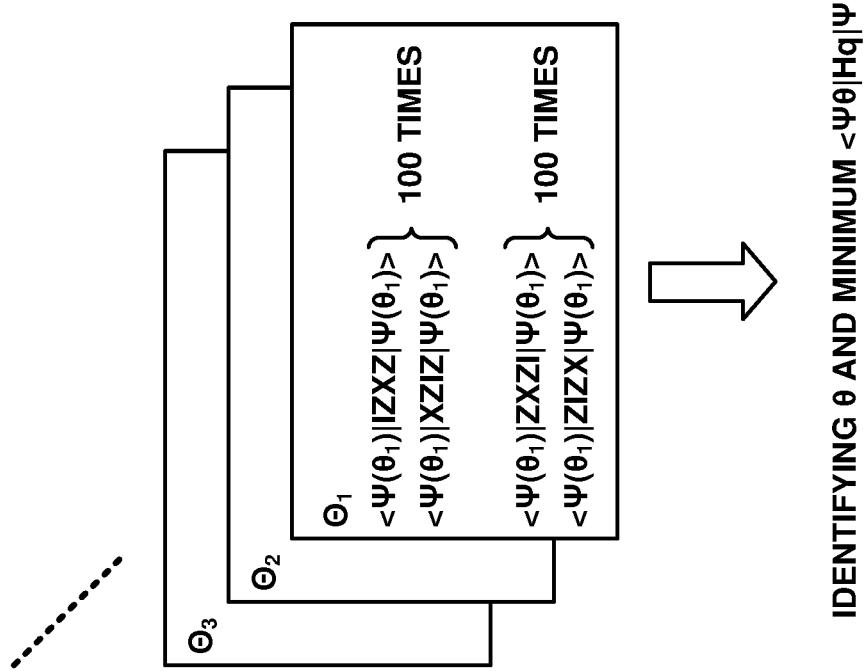
FIG. 5 depicts a block diagram of another example expectation value calculation in accordance with an illustrative embodiment.

FIG. 4 shows the process flow of the VQE. The quantum computer may execute the VQE by performing the processes of S210 to S270 shown in FIG. 4. Here, S210 to S260 correspond to the first loop of the outermost iteration, S230 to S250 correspond to the second loop of the middle iteration, and S230 corresponds to the third loop of the inner iteration.

First, at S210, the quantum computer updates θ. Here, θ may be a parameter identifying the wave function Ψ. For example, θ includes one or more types of functions contained in Ψ, a coefficient of each function, and values designating adjustment terms or the like. As an example, θ may be a vector including integers and/or real numbers.

At the first performance of S210, the quantum computer may set the designated θ, or θ may be determined randomly. At the second and following performances of S210, the quantum computer may set a θ for which reduction of the expectation value is predicted, based on a known algorithm such as derivative-free optimization methods.

At S220, the quantum computer initializes α. Here, α may be a variable designating the Pauli observable Pα. For example, the Pauli observable P1 corresponding to the time when α=1 may be IZXZ, and the Pauli observables P2 to P5 respectively corresponding to the times when α=2 to α=5 may be ZXZI, XXXX, ZIZX, and XZIZ.

Next, at S230, the quantum computer performs a quantum calculation of the Pauli observable corresponding to α. For example, the quantum computer performs the quantum calculation of the expectation value $<P_\alpha> = <\Psi(\theta)|P_\alpha|\Psi(\theta)>$ one time. As an example, when α=1 at step S230, the quantum computer performs the calculation of $<\Psi(\theta)|IZXZ|\Psi(\theta)>$ one time. The quantum computer performs the quantum calculation of S230 a predetermined number N of times (e.g. 100 times) in the third loop.

After the process of the third loop, at S240, the quantum computer statistically determines the expectation value of the Pauli observable corresponding to α. For example, when α=1, the quantum computer calculates a statistical quantity (e.g. an average value, a median value, or a most numerous numerical value) of N calculation results of $<\Psi(\theta)|IZXZ|\Psi(\theta)>$, and outputs the result as the calculation result of the expectation value $<P_\alpha>$.

Next, at S250, the quantum computer updates α. For example, the quantum computer adds 1 to α. After this, if α is less than or equal to a predetermined number (e.g. 5), the quantum computer again performs the process of the third loop, and if α is not less than or equal to the predetermined number, the quantum computer may end the process of the second loop and perform the process of S260.

At S260, the quantum computer calculates the expectation value of the qubit Hamiltonian for the current θ. For example, the quantum computer calculates the expectation value $<H_q>$ using $\Sigma(h_\alpha <P_\alpha>)$. Here, $h_\alpha$ may be a coefficient for each Pauli observable, and corresponds to "a" to "e" in Expression 1, for example. After this, if an end condition (e.g. the ending of the update of θ a prescribed number of times, no further improvement of the expectation value $<H_q>$ being realized, or the like) is satisfied, the quantum computer performs the process of S270, and if this end condition is not satisfied, the quantum computer returns to the process of S210.

At S270, the quantum computer determines the minimum expectation value $<H_q>$ and the θ that yields this minimum expectation value $<H_q>$, and outputs these values.

In this way, with the VQE, the minimum expectation value $<H_q>$ is determined by performing the process of the three iterations in the first to third loops. Here, if a plurality of Pauli observables are processed together, the processes of the second loop can be made more efficient.

Therefore, the apparatus in embodiments of the present invention uses observables that are jointly measurable by entangled measurement, to improve the efficiency of the processes of the second loop of the VQE.

An application implements an embodiment. In an embodiment, the application receives a set of Pauli observables to be measured. For example, the application can receive the set of Pauli observables {ZIII, IZII, IXZX, ZZII, ZIZI, IZIZ, IZZI, ZIIZ, IIZZ, YYXX, YYYY, XXXX, XXYY}.

In the embodiment, the application initializes a measurement basis, the measurement basis comprising a set of Pauli bases equivalent to a number of qubits of a quantum processor. In particular embodiments, each Pauli base in the set of Pauli bases is the same. In particular embodiments, each Pauli base in the set of Pauli bases are the Pauli base Z. In particular embodiments, each Pauli base in the set of Pauli bases are the Pauli base X.

In an embodiment, the application creates a list, the list including a set of Bell basis candidates. In an embodiment, each Bell basis candidate of the set of Bell basis candidates is configured to measure at least one of the set of Pauli observables. For example, the application can create a list of the set of Bell basis candidates including B(0, 1), B(2, 3), and B(1, 3) from the received set of Pauli observables. In an embodiment, the application computes a score for each of the set of Bell basis candidates in the list. In particular embodiments, the application determines a number of Pauli observables in the set of Pauli observables measurable by each of the set of Bell basis candidates in the list.

In a particular embodiment, the score of a corresponding Bell basis candidate equals a number of Pauli observables measurable by the corresponding Bell basis candidate. In a particular embodiment, the score of a corresponding Bell basis candidate equals a number of Pauli observables measurable after replacing two Pauli observables in the measurement basis with the corresponding Bell basis candidate minus a number of Pauli observables measurable by the measurement basis. In a particular embodiment, the score of a corresponding Bell basis candidate equals a number of Pauli observables measurable after replacing two Pauli observables in the measurement basis with the corresponding Bell basis candidate minus a number of Pauli observables measurable by the measurement basis, each Pauli observable in the set of Pauli observables including a weighting factor. In a particular embodiment, the weighting factor is computed based on the type of each Pauli observable in a Fermionic form.

In an embodiment, the application compares a set of scores corresponding to the set of Bell basis candidates to determine a maximum score in the set of scores. In an embodiment, the application selects a Bell basis candidate with the maximum score. For example, Bell basis candidate B(0, 1) has a score of 4, Bell basis candidate B(2, 3) has a score of 4, and Bell basis candidate B(1, 3) has a score of 1. In an embodiment, the application selects Bell basis candidate B(0, 1). In an embodiment, the application replaces, using the selected Bell basis candidate, a subset of the set of Pauli bases in the measurement basis with the selected Bell basis candidate thereby configuring a new measurement basis.

In an embodiment, the application removes the selected Bell basis candidate from the list of the set of Bell basis candidates. In an embodiment, the application determines whether any remaining Bell basis candidates include a qubit in common with the selected Bell basis candidate. In an embodiment, the application removes, in response to at least one Bell basis candidate including a qubit in common with the selected Bell basis candidate, the at least one Bell basis candidate from the list of the set of Bell basis candidates.

In an embodiment, the application determines whether the list is empty. In an embodiment, the application returns, in response to the list being empty, a subset of the set of Pauli observables measurable by the new measurement basis. In an embodiment, the application computes, in response to the list including at least one Bell basis candidate, a second score for each of the set of Bell basis candidates in the list. In particular embodiments, the application determines a number of Pauli observables in the set of Pauli observables measurable by each of the set of Bell basis candidates in the list.

In a particular embodiment, the second score of a corresponding Bell basis candidate equals a number of Pauli observables measurable by the corresponding Bell basis candidate. In a particular embodiment, the second score of a corresponding Bell basis candidate equals a number of Pauli observables measurable after replacing two Pauli observables in the measurement basis with the corresponding Bell basis candidate minus a number of Pauli observables measurable by the measurement basis. In a particular embodiment, the second score of a corresponding Bell basis candidate equals a number of Pauli observables measurable after replacing two Pauli observables in the measurement basis with the corresponding Bell basis candidate minus a number of Pauli observables measurable by the measurement basis, each Pauli observable in the set of Pauli observables including a weighting factor.

In an embodiment, the application compares a set of second scores corresponding to the set of Bell basis candidates to determine a second maximum score in the set of second scores. In an embodiment, the application selects a second Bell basis candidate with a second maximum score. In an embodiment, the application replaces, using the selected second Bell basis candidate, a second subset of the set of Pauli bases in the measurement basis with the selected second Bell basis candidate thereby reconfiguring the new measurement basis into a reconfigured measurement basis.

In an embodiment, the application removes the selected second Bell basis candidate from the list of the set of Bell basis candidates. In an embodiment, the application determines whether any remaining Bell basis candidates include a qubit in common with the second selected Bell basis candidate. In an embodiment, the application removes, in response to at least one Bell basis candidate including a qubit in common with the selected second Bell basis candidate, the at least one Bell basis candidate from the list of the set of Bell basis candidates.

In an embodiment, the application determines whether the list is empty. In an embodiment, the application returns, in response to the list being empty, a second subset of the set of Pauli observables measurable by the reconfigured measurement basis. In an embodiment, the application can continue in this manner until the list is empty.

An embodiment can be implemented as a software application. The application implementing an embodiment, or one or more components thereof, can be configured as a modification of an existing quantum-classical data processing system—i.e., a native application in the classical computing system that produces inputs for a quantum computing system, as an application executing in a classical data processing system communicating with an existing quantum computing system over a network, as a separate application that operates in conjunction with an existing quantum-classical system in other ways, a standalone application for execution on a classical system, or some combination thereof.

The illustrative embodiments are described with respect to certain types of algorithms, libraries, code, instructions, dimensions, data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
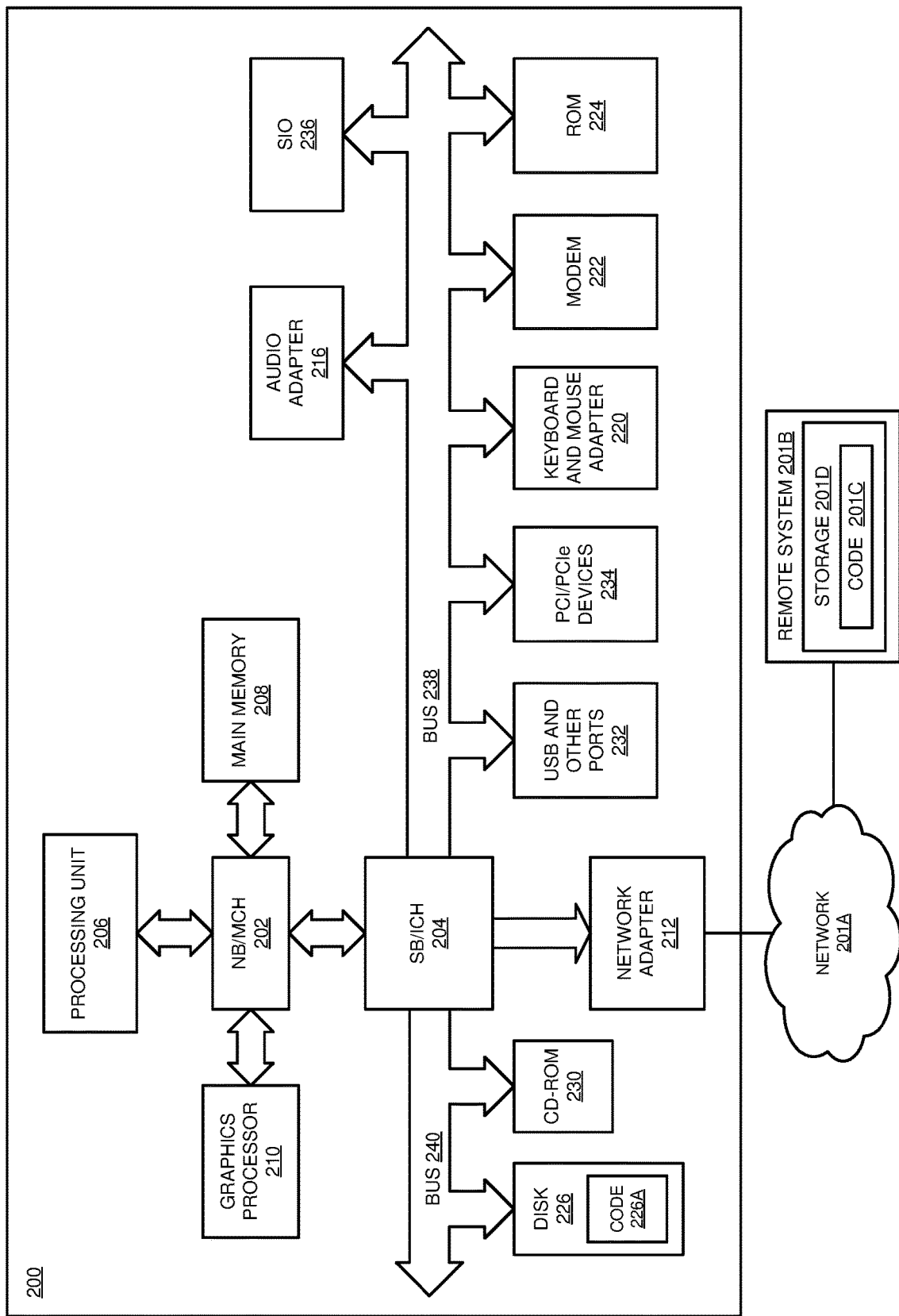
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of classical computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 105 and server 106 are classical data processing systems and couple to network 102 along with storage unit 108. Software applications may execute on any computer in data processing environment 100. Clients 110, 112, and 114 are also coupled to network 102. A data processing system, such as server 105 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 105 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 105, 106, 110, 112, and 114 also represent example nodes in a cluster, partitions, and other configurations suitable for implementing an embodiment.

Device 132 is an example of a device described herein. For example, device 132 can take the form of a classical data processing system, such as a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements the grouping of Pauli observables using Bell measurements of an embodiment described herein. Application 105 groups Pauli observables using a hybrid basis.

Servers 105 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 105 may provide data, such as boot files, operating system images, and applications to clients 110, 112, and 114. Clients 110, 112, and 114 may be clients to server 105 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 105 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 6:
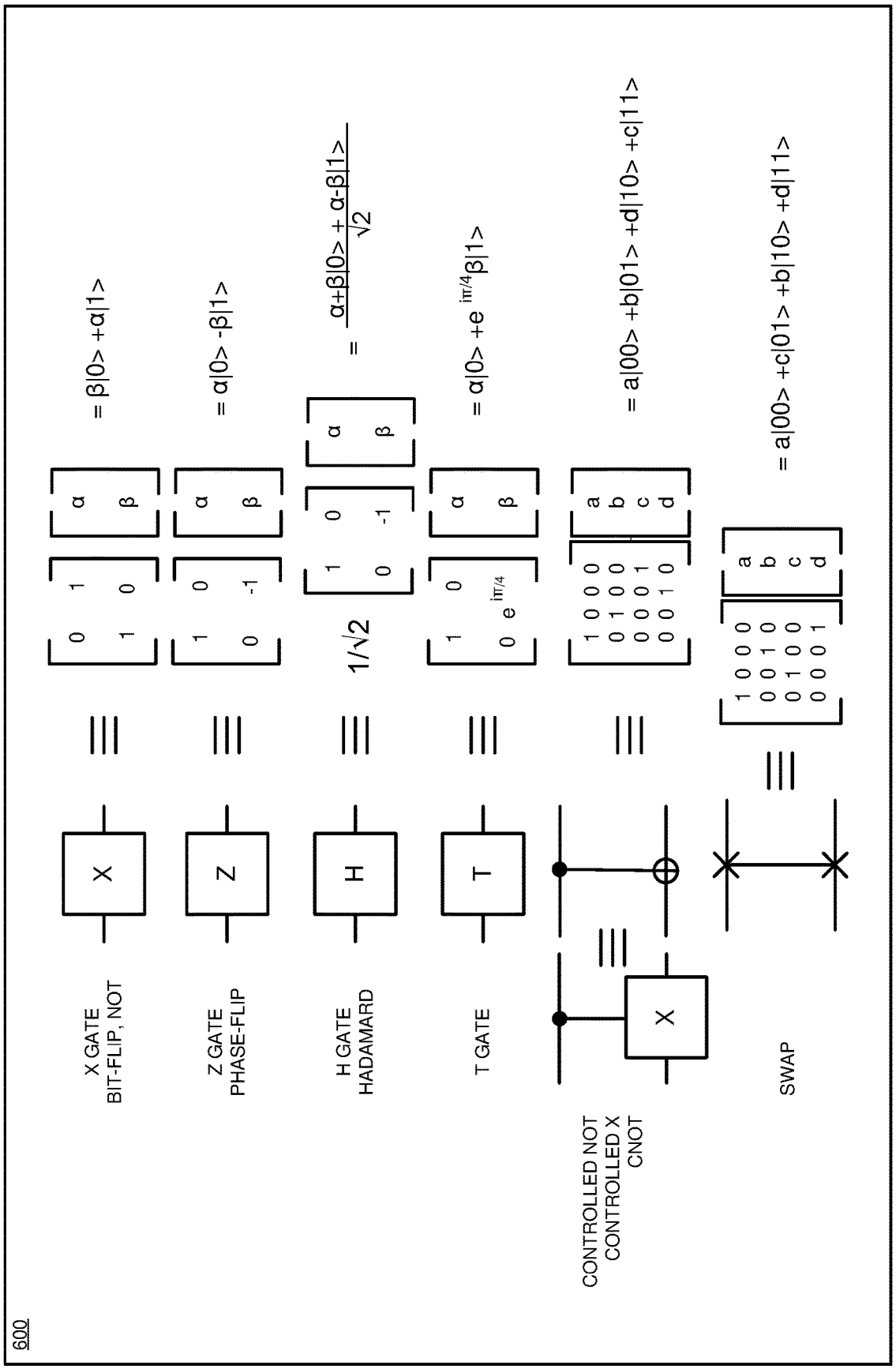
FIG. 6 depicts a simplified diagram of matrix representations of example general quantum circuit gates in accordance with an illustrative embodiment.

With reference to FIG. 6, this figure depicts a simplified diagram 600 of matrix representations of example general quantum circuit gates in accordance with an illustrative embodiment. In the illustrate example, matrix representations and corresponding linear equations of a bit-flip NOT (X) gate, a phase-flip (Z) gate, a Hadamard (H) gate, a phase shift (T) gate, a controlled NOT (controlled X or CNOT) gate, and a swap gate are shown.

Figure 7:
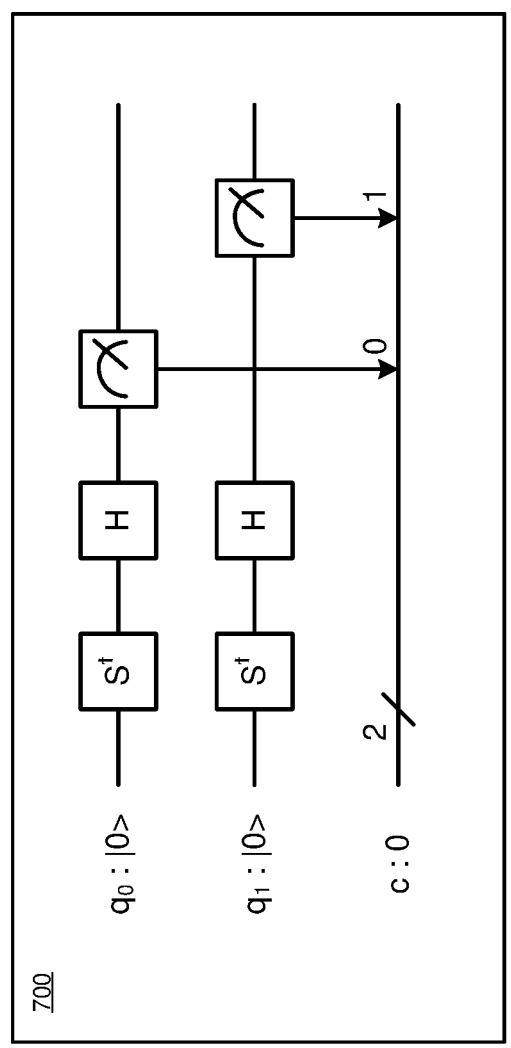
FIG. 7 depicts an example quantum circuit in accordance with an illustrative embodiment.

With reference to FIG. 7, this figure depicts an example quantum circuit 700 corresponding to the Pauli observables YY, IY, YI, and II. |0> indicates a quantum state, St indicates a quantum gate to rotate an input quantum bit $-\pi/2$ around Z axis, H indicates a Hadamard gate, and a measurement on $q_0$ and $q_1$, $q_0$ indicates the quantum bit of the first bit, $q_1$ indicates the quantum bit of the second bit, and c indicates the classical bits of the output with size 2. Quantum circuit 700 corresponds to a measurement in Pauli TPB "YY".

Figure 8:
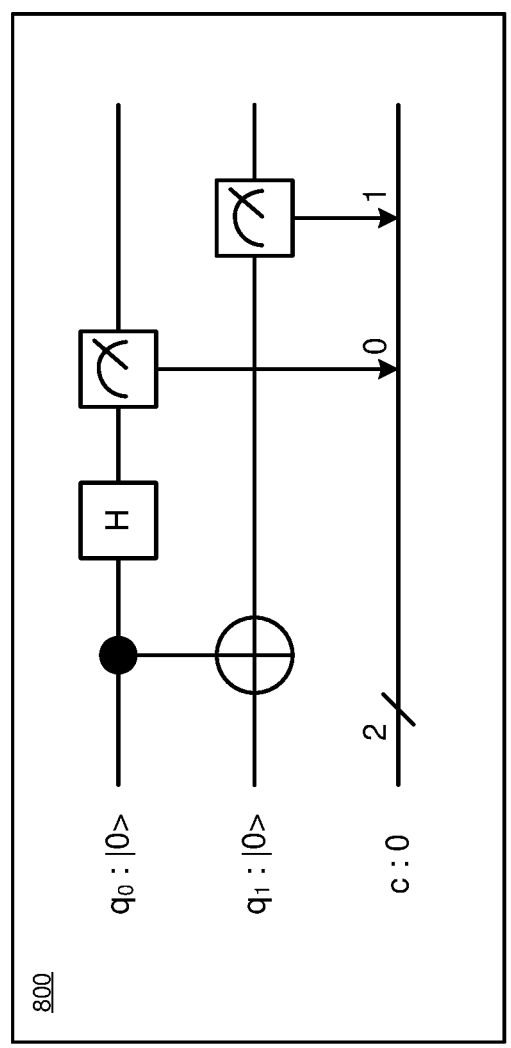
FIG. 8 depicts another example quantum circuit in accordance with an illustrative embodiment.

With reference to FIG. 8, this figure depicts an example quantum circuit 800 corresponding to Pauli observables II, XX, YY, and ZZ. |0> indicates a quantum state, a controlled NOT gate acts with target qubit $q_0$ and control qubit $q_1$, H indicates a Hadamard gate, a measurement on $q_0$ and $q_1$, $q_0$ indicates the quantum bit of the first bit, q1 indicates the quantum bit of the second bit, and c indicates the classical bits of the output with size 2. Quantum circuit 800 corresponds to a measurement in Bell basis, B(0, 1).

Figure 9:
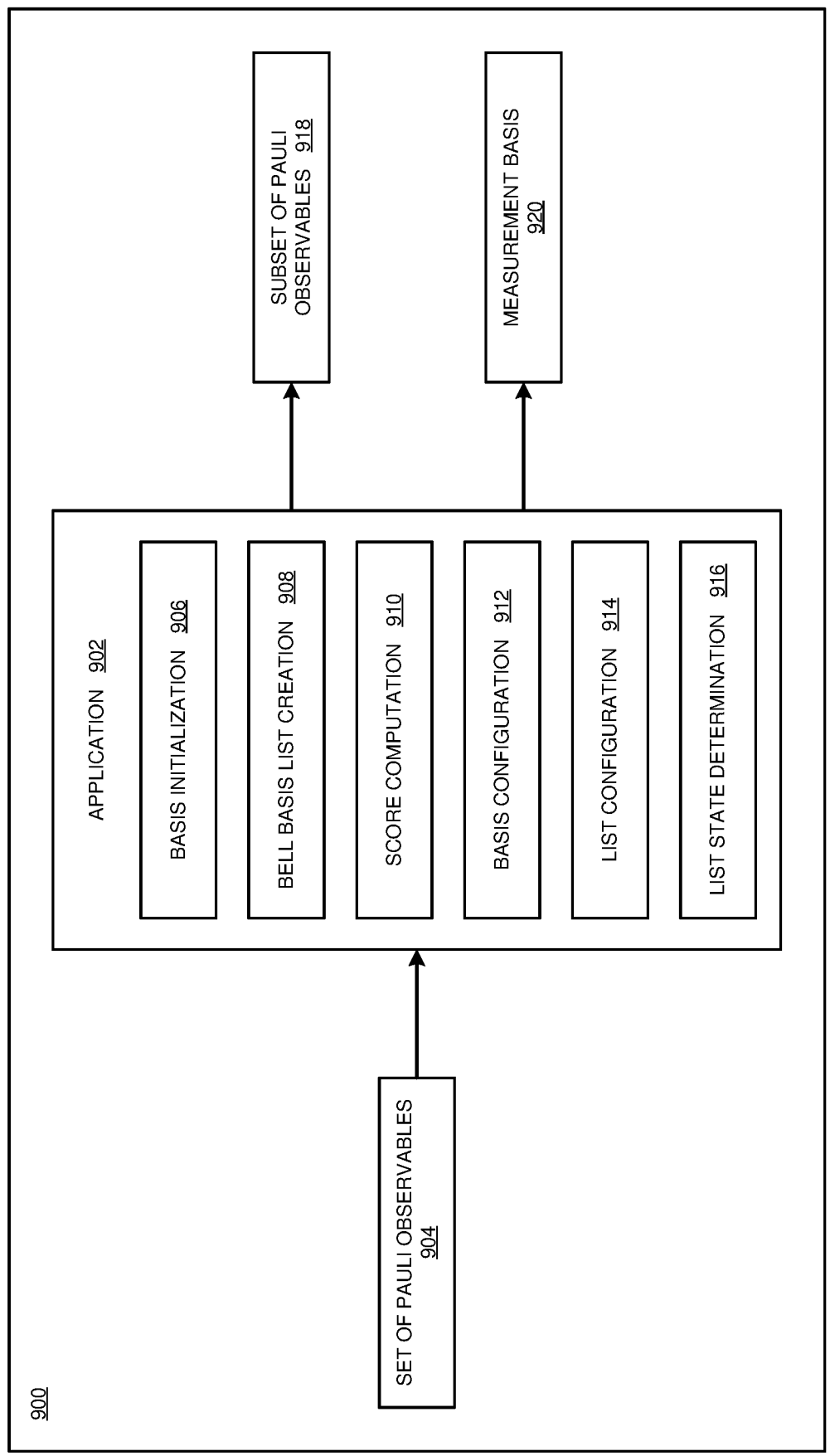
FIG. 9 depicts a block diagram of an example configuration for grouping of Pauli observables using Bell measurements in accordance with an illustrative embodiment.

With reference to FIG. 9, this figure depicts a block diagram of an example configuration 900 for grouping of Pauli observables using Bell measurements in accordance with an illustrative embodiment. In an embodiment, application 902 is an example of application 105 in FIG. 1.

Application 902 includes a basis initialization component 906, Bell basis list creation component 908, score computation component 910, basis configuration component 912, list configuration component 914, and list state determination component 916. Application 902 receives a set of Pauli observables 904. Basis initialization component 906 is configured to initialize a measurement basis. In a particular embodiment, the measurement basis includes a set of Pauli bases equivalent to a number of qubits of a quantum processor. In a particular embodiment, each Pauli base in the set of Pauli bases is the same Pauli base.

Bell basis list creation component 908 is configured to create a list including a set of Bell basis candidates (BBC). In a particular embodiment, each BBC in the set of BBC is configured to measure at least one of the set of Pauli observables. Score computation component 910 is configured to compute a set of scores, each score of the set of scores corresponding to a BBC in the list. In a particular embodiment, component 910 determines a number of Pauli observables of the set of Pauli observables 904 measurable by each of the set of BBC in the list. In a particular embodiment, the score of a corresponding BBC equals a number of Pauli observables in the set of Pauli observables 904 measurable by the corresponding BBC.

Basis configuration component 912 is configured to select a BBC from the list of BBC corresponding to a maximum score. In an embodiment, component 912 compares a set of scores corresponding to the set of Bell basis candidates to determine a maximum score in the set of scores. In an embodiment, component 912 replaces, using the selected BBC, a subset of the set of Pauli bases in the measurement basis with the selected BBC, thereby configuring a new measurement basis.

List configuration component 914 configures the list of BBC. In an embodiment, component 914 removes the selected Bell basis candidate from the list of the set of Bell basis candidates. In an embodiment, component 914 determines whether any remaining Bell basis candidates include a qubit in common with the selected Bell basis candidate. In an embodiment, component 914 removes, in response to at least one Bell basis candidate including a qubit in common with the selected Bell basis candidate, the at least one Bell basis candidate from the list of the set of Bell basis candidates List state determination component 916 determines a state of the list of BBC. In an embodiment, component 916 determines whether the list is empty. In an embodiment, application 902 returns, in response to the list being empty, a subset of the set of Pauli observables 918 measurable by the new measurement basis 920. In an embodiment, application 902 computes, in response to the list including at least one Bell basis candidate, a second score for each of the set of Bell basis candidates in the list.

Figure 10:
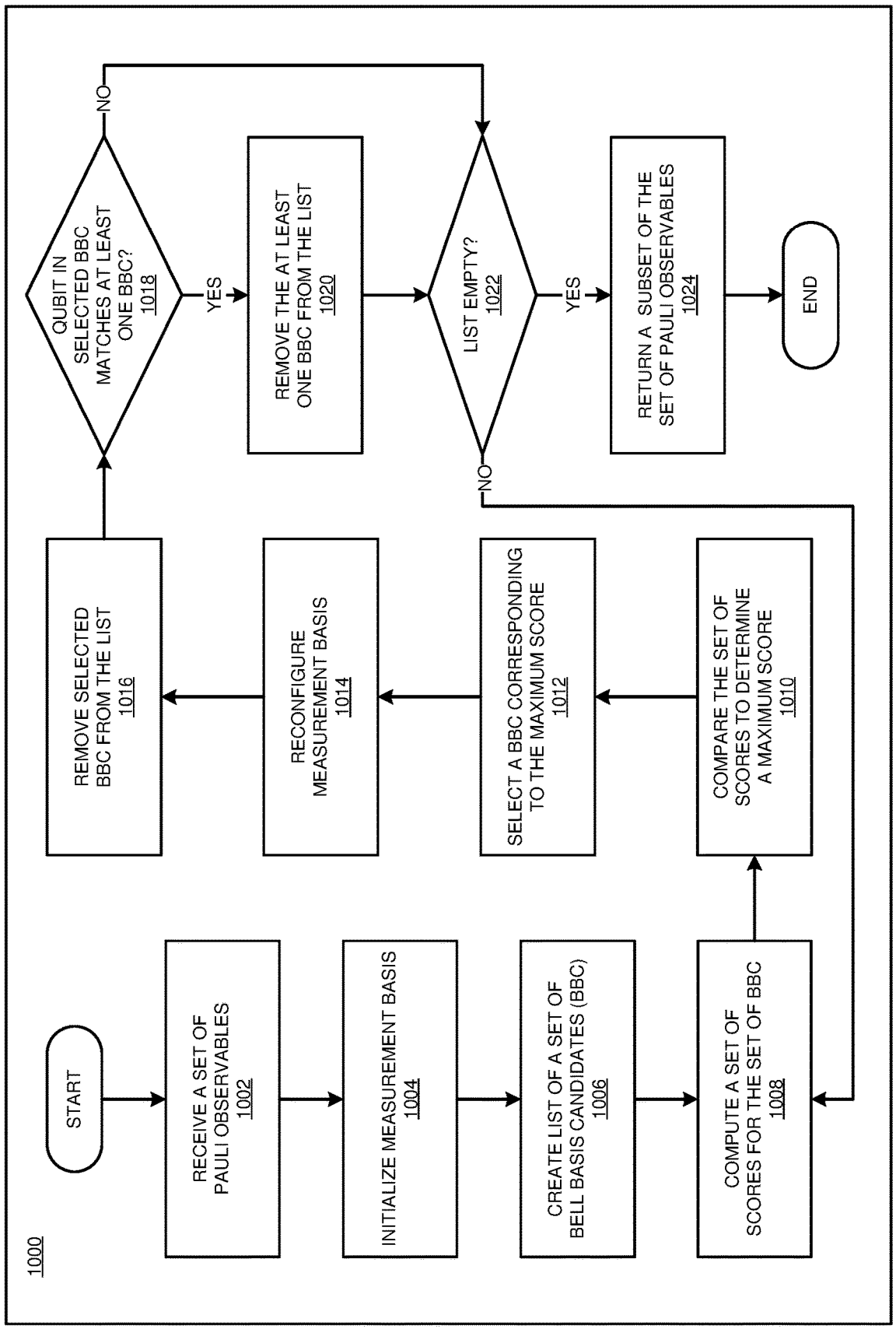
FIG. 10 depicts a flowchart of an example process for grouping Pauli observables using Bell measurements in accordance with an illustrative embodiment.

With reference to FIG. 10, this figure depicts a flowchart of an example process 1000 for grouping Pauli observables using Bell measurements in accordance with an illustrative embodiment. In one or more embodiments, process 1000 is implemented in part by application 105 or application 902.

In block 1002, application 105 receives a set of Pauli observables to be measured. In block 1004, application 105 initializes a measurement basis. In block 1006, application 105 creates a list of a set of Bell basis candidates. In block 1008, application 105 computes a set of scores for the set of Bell basis candidates. In an embodiment, a corresponding score for a Bell basis candidate of the set of Bell basis candidates corresponds to a number of Pauli observables in the set of Pauli observables measurable by the Bell basis candidate.

In block 1010, application 105 compares the set of scores to determine a maximum score. In block 1012, application 105 selects a Bell basis candidate corresponding to the maximum score. In block 1014, application 105 reconfigures the measurement basis using the selected Bell basis candidate. In a particular embodiment, application 105 replaces a subset of a set of bases of the measurement basis with the selected Bell basis candidate.

In block 1016, application 105 removes the selected Bell basis candidate from the list. In block 1018, application 105 determines whether a qubit in the selected Bell basis candidate matches a qubit in at least one Bell basis candidate in the list. In block 1020 (YES path of block 1018), application

105 removes the at least one Bell basis candidate from the list. Process 1000 then continues to block 1022.

In block 1022, application 105 determines whether the list is empty. If the list contains at least one Bell basis candidate (NO path of block 1022), application 105 returns to block 1008 to compute a second set of scores for the remaining Bell basis candidates in the list. If the list is empty, (YES path of block 1022) application 105 returns a subset of the set of Pauli observables measurable by the reconfigured measurement basis.

Thus, a computer implemented method, system or apparatus, and computer program product are provided in the illustrative embodiments for grouping of Pauli observables using Bell measurements and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, by a classical processor, a set of Pauli observables;
   initializing, by the classical processor, a measurement basis used by a quantum processor to perform a quantum algorithm, the measurement basis comprising a set of Pauli bases equivalent to a number of qubits of the quantum processor;
   creating, by the classical processor, a list of a set of Bell basis candidates, each of the set of Bell basis candidates configured to measure at least one of the set of Pauli observables;
   selecting, by the classical processor, a Bell basis candidate from the set of Bell basis candidates; and
   reconfiguring, by the classical processor, the measurement basis of the quantum processor by replacing a subset of the set of Pauli bases with the selected Bell basis candidate and thereby reducing a number of measurements required for the quantum processor to perform the quantum algorithm.

2. The method of claim 1, wherein the set of Pauli bases are the same Pauli basis.

3. The method of claim 1, further comprising:
   computing a set of scores for the set of Bell basis candidates.

4. The method of claim 3, further comprising:
   comparing the set of scores to determine a maximum score.

5. The method of claim 4, wherein the selected Bell basis candidate corresponds to the maximum score.

6. The method of claim 1, further comprising:
   removing the selected Bell basis candidate from the list.

7. The method of claim 6, further comprising:
   determining whether a qubit in the selected Bell basis candidate matches a qubit of at least one Bell basis candidate in the list.

8. The method of claim 7, further comprising:
   removing the at least one Bell basis candidate from the list.

9. The method of claim 6, further comprising:
   determining whether the list is empty.

10. The method of claim 9, further comprising:
    returning, responsive to the list being empty, a subset of the set of Pauli observables measurable by the reconfigured measurement basis.

11. The method of claim 9, further comprising:
    computing, responsive to the list comprising at least one Bell basis candidate, a second set of scores for the set of Bell basis candidates;
    selecting a second Bell basis candidate from the set of Bell basis candidates; and
    reconfiguring the measurement basis to replace a second subset of the set of Pauli bases with the selected second Bell basis candidate.

12. A computer usable program product comprising one or more computer-readable storage devices, and program instructions stored on at least one of the one or more storage devices, the stored program instructions comprising:
    program instructions to receive, by a classical processor, a set of Pauli observables;
    program instructions to initialize, by the classical processor, a measurement basis used by a quantum processor to perform a quantum algorithm, the measurement basis comprising a set of Pauli bases equivalent to a number of qubits of the quantum processor;
    program instructions to create, by the classical processor, a list of a set of Bell basis candidates, each of the set of Bell basis candidates configured to measure at least one of the set of Pauli observables;
    program instructions to select, by the classical processor, a Bell basis candidate from the set of Bell basis candidates; and
    program instructions to reconfigure, by the classical processor, the measurement basis of the quantum processor by replacing a subset of the set of Pauli bases with the selected Bell basis candidate and thereby reducing a number of measurements required for the quantum processor to perform the quantum algorithm.

13. The computer usable program product of claim 12, wherein the set of Pauli bases are the same Pauli basis.

14. The computer usable program product of claim 12, further comprising:
    program instructions to compute a set of scores for the set of Bell basis candidates.

15. The computer usable program product of claim 14, further comprising:
    comparing the set of scores to determine a maximum score.

16. The computer usable program product of claim 15, wherein the selected Bell basis candidate corresponds to the maximum score.

17. The computer usable program product of claim 12, further comprising:
    program instructions to remove the selected Bell basis candidate from the list.

18. The computer usable program product of claim 12, wherein the program instructions are stored in a computer readable storage device in a data processing system, and wherein the program instructions are transferred over a network from a remote data processing system.

19. The computer usable program product of claim 12, wherein the program instructions are stored in a computer readable storage device in a server data processing system, and wherein the program instructions are downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, by a classical processor, a set of Pauli observables;

program instructions to initialize, by the classical processor, a measurement basis used by a quantum processor to perform a quantum algorithm, the measurement basis comprising a set of Pauli bases equivalent to a number of qubits of the quantum processor;

program instructions to create, by the classical processor, a list of a set of Bell basis candidates, each of the set of Bell basis candidates configured to measure at least one of the set of Pauli observables;

program instructions to select, by the classical processor, a Bell basis candidate from the set of Bell basis candidates; and program instructions to reconfigure, by the classical processor, the measurement basis of the quantum processor by replacing a subset of the set of Pauli bases with the selected Bell basis candidate and thereby reducing a number of measurements required for the quantum processor to perform the quantum algorithm.

* * * * *